United States Patent Office 2,960,507
Patented Nov. 15, 1960

2,960,507

PIPERIDINE COMPOUNDS

Edward Severin Stern and Robert Lawson Watt, Edinburgh, Scotland, assignors to J. F. MacFarlan & Company Limited, Boreham Wood, Hertfordshire, England, a British company No Drawing. Filed Feb. 26, 1959, Ser. No. 795,603

Claims priority, application Great Britain Mar. 3, 1958

1 Claim. (Cl. 260—294.7)

This invention relates to novel piperidine compounds and their production.

The compounds of the present invention have the general formula:

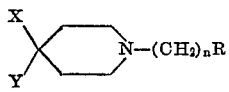

and acid addition salts thereof, where X is a phenyl group, Y is a hydroxyl group or an esterified hydroxyl group (such as an acetoxy or propionoxy group), R is an alkoxy, aryloxy aralkoxy or cycloalkoxy group or a heterocyclic residue containing an oxygen atom, and $n$ is 2, 3, 4, 5 or 6.

The substances of the present invention have analgesic properties and depress the cough-reflex centre.

The present invention also includes a process for the preparation of the novel compounds of the present invention wherein a halide of the general formula R.(CH$_2$)$_n$Hal, where Hal is chlorine, bromine or iodine and R and $n$ have the meanings given above, is reacted with a secondary base of the general formula:

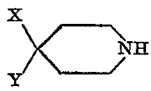

where X and Y have the meanings given above.

The bases of the present invention can be converted into their acid addition salts by treatment with appropriate acids.

The following examples, in which the parts are by weight, illustrate the invention:

*Example 1.—1-2'-tetrahydrofurfuryloxyethyl-4-phenyl-piperidin-4-ol*

A mixture of 30 parts of 4-phenylpiperidin-4-ol, M.P. 158–160° C., and 33 parts of 2-tetrahydrofurfuryloxyethyl chloride in amyl alcohol (150 parts) was refluxed for 48 hours in the presence of solid sodium carbonate (25 parts). Filtration and fractional distillation of the filtrate gave lower boiling material and then 1-2'-tetrahydrofurfuryloxyethyl-4-phenylpiperidin-4-ol of B.P. 125–135° C./0.5 mm., $n_d^{20}$ 1.5380. The corresponding 4-propionate had powerful analgesic action.

*Example 2.—1-2'-phenoxyethyl-4-phenylpiperidin-4-ol*

A mixture of 4-phenylpiperidin-4-ol (30 parts) and 2-phenoxyethyl chloride (31 parts) in amyl alcohol (150 parts) was refluxed over solid sodium carbonate (25 parts) for 43 hours. Filtration and vacuum evaporation of the solvent left a yellowish oil which solidified when treated with concentrated aqueous hydrobromic acid. The hydrobromide of the base had M.P. 134.5° C. after crystallisation from aqueous alcohol. The 4-propionyl derivative had good analgesic action.

*Example 3.—1-2'-ethoxyethyl-4-phenylpiperidin-4-ol*

A mixture of 4-phenylpiperidin-4-ol (30 parts) and 2-ethoxyethyl chloride (22 parts) in amyl alcohol (150 parts) was refluxed over sodium carbonate (30 parts) for 48 hours. The product was filtered and the filtrate fractionally distilled under reduced pressure. 1-2'-ethoxyethyl-4-phenylpiperidin-4-ol had B.P. 155–160° C./0.8 mm., $n_D^{20}$ 1.5310 and solidified in keeping; it then had M.P. 45–46° C. Its 4-propionyl derivative had useful analgesic potency.

*Example 4.—1-2'-benzyloxyethyl-4-phenylpiperidin-4-ol propionate hydrochloride*

A mixture of 4-phenyl-4-propionoxy piperidine (25 parts) M.P. 170° C. (obtained by hydrogenolysis of 1-benzyl-4-phenyl-4-propionoxypiperidine in methanol over palladised carbon at 50° C.) and 2-benzyloxyethyl chloride (20 parts) was kept in boiling pentanol for 48 hours over sodium carbonate (5 parts). The suspension was filtered and the filtrate evaporated to dryness. On addition of alcoholic hydrochloric acid and ether, 1-2'-benzyloxyethyl-4-phenylpiperidin-4-ol propionate hydrochloride was obtained of M.P. 168–172° C. It had potent analgesic action.

What we claim is:
1-2'-tetrahydrofurfuryloxyethyl-4-phenylpiperidin-4-ol.

References Cited in the file of this patent

UNITED STATES PATENTS

| | | |
|---|---|---|
| 2,784,192 | Schmidle et al. | Mar. 5, 1957 |
| 2,850,500 | Elpern | Sept. 12, 1958 |